(12) United States Patent
Sato

(10) Patent No.: US 10,017,116 B2
(45) Date of Patent: Jul. 10, 2018

(54) IMAGE DISPLAY APPARATUS

(71) Applicant: TOYOTA JIDOSHA KABUSHIKI KAISHA, Toyota-shi, Aichi-ken (JP)

(72) Inventor: Jun Sato, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/357,547

(22) Filed: Nov. 21, 2016

(65) Prior Publication Data

US 2017/0151910 A1    Jun. 1, 2017

(30) Foreign Application Priority Data

Nov. 26, 2015   (JP) .................................. 2015-230727

(51) Int. Cl.
*B60R 1/00* (2006.01)
*G06F 3/14* (2006.01)

(52) U.S. Cl.
CPC .................. *B60R 1/00* (2013.01); *G06F 3/14* (2013.01); *B60R 2300/205* (2013.01); *B60R 2300/207* (2013.01); *B60R 2300/301* (2013.01); *B60R 2300/607* (2013.01); *B60R 2300/8086* (2013.01)

(58) Field of Classification Search
None
See application file for complete search history.

(56) References Cited

U.S. PATENT DOCUMENTS

| | | |
|---|---|---|
| 5,906,645 A | 5/1999 | Kagawa et al. |
| 2010/0106356 A1* | 4/2010 | Trepagnier ............ G01S 17/023 701/25 |
| 2010/0211248 A1* | 8/2010 | Craig .................... B60W 30/02 701/31.4 |
| 2015/0154458 A1* | 6/2015 | Lee ..................... G06K 9/00798 348/118 |
| 2015/0259007 A1* | 9/2015 | Di Cairano .......... B62D 15/025 701/41 |

(Continued)

FOREIGN PATENT DOCUMENTS

| | | |
|---|---|---|
| JP | 60-244628 A | 12/1985 |
| JP | 09-222922 A | 8/1997 |

(Continued)

OTHER PUBLICATIONS

U.S. Appl. No. 15/337,593, Jun Sato, filed Oct. 28, 2016.

*Primary Examiner* — James A Thompson
(74) *Attorney, Agent, or Firm* — Sughrue Mion, PLLC

(57) ABSTRACT

An image display apparatus for displaying an image related to an autonomous driving control of an autonomous driving system on a display surface of an in-vehicle display of a vehicle is configured such that, when the vehicle is in the autonomous driving control, the image display apparatus displays: a traveling road overlook image showing the vehicle and a traveling road where the vehicle runs in a bird's-eye view; a stability display image positioned in a traveling direction of the vehicle in the traveling road overlook image, the stability display image being configured to change according to stability information inside a rectangular frame extending in a direction intersecting with the travelling direction; and a subsequent action text image positioned in the traveling direction relative to the stability display image and indicative of subsequent action information.

8 Claims, 6 Drawing Sheets

(56) References Cited

U.S. PATENT DOCUMENTS

| | | | |
|---|---|---|---|
| 2016/0170487 A1* | 6/2016 | Saisho | G01C 21/3635 345/156 |
| 2016/0182823 A1* | 6/2016 | Murasumi | B60R 1/00 348/38 |
| 2017/0113686 A1 | 4/2017 | Horita et al. | |

FOREIGN PATENT DOCUMENTS

| | | |
|---|---|---|
| JP | 2001-199295 A | 7/2001 |
| JP | 2015-108519 A | 6/2015 |
| JP | 2015-199439 A | 11/2015 |
| WO | 2015/162764 A1 | 10/2015 |

* cited by examiner

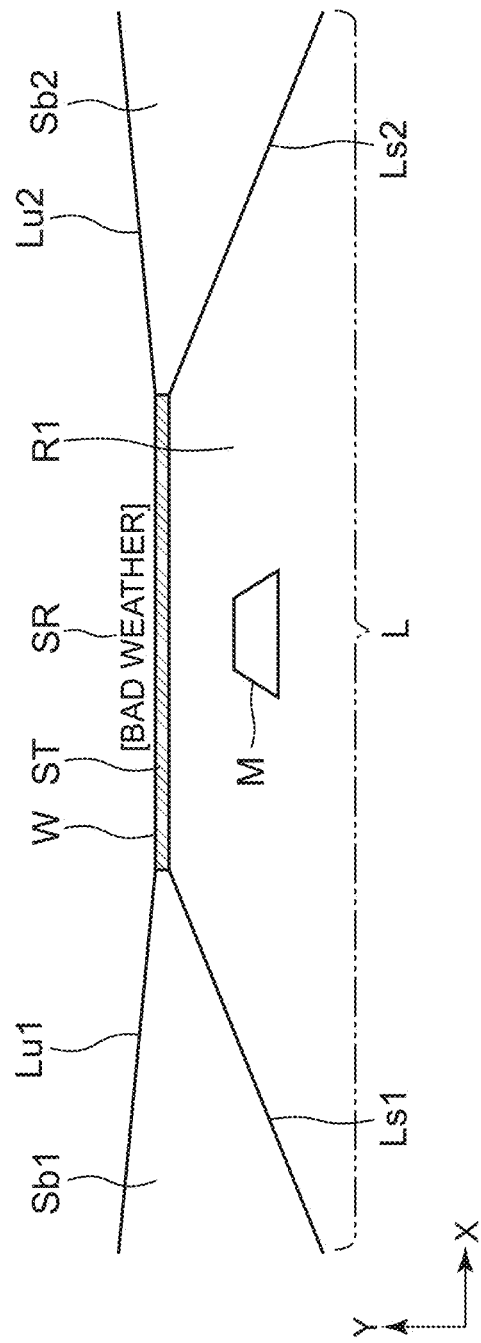

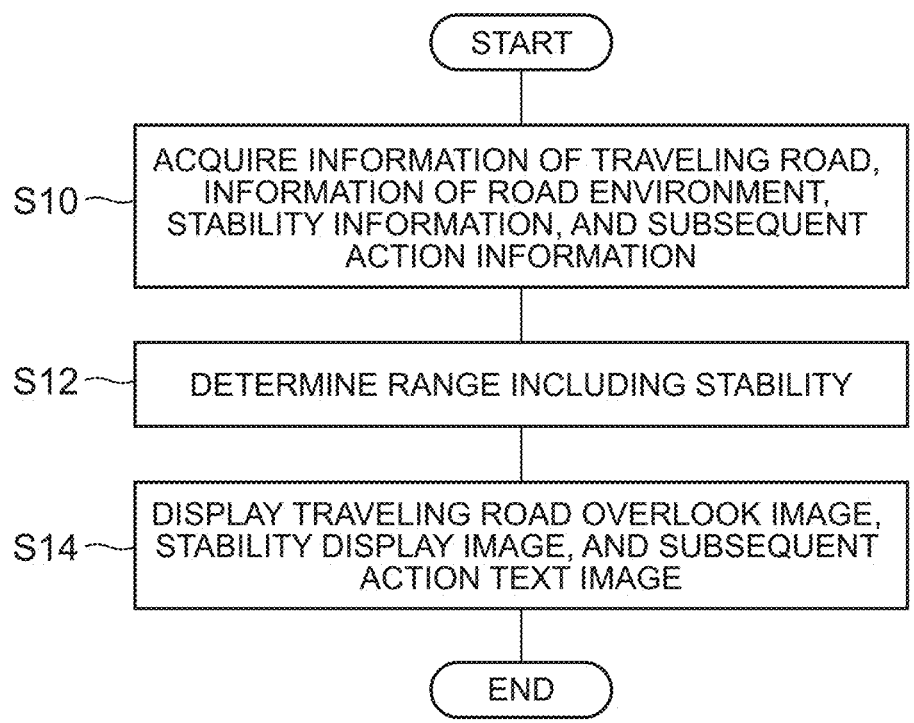

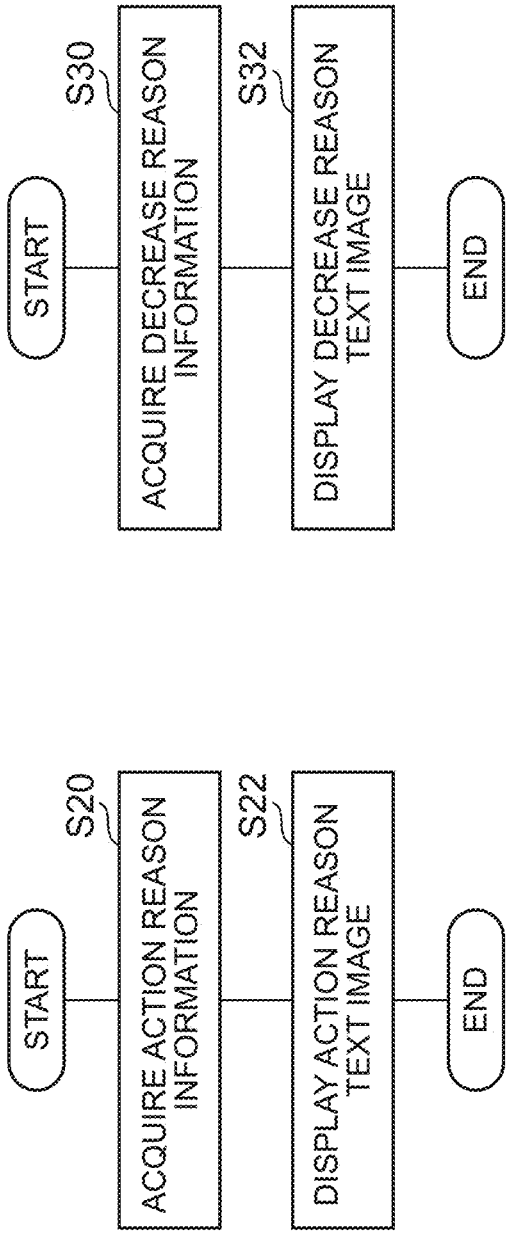

IMAGE DISPLAY APPARATUS

INCORPORATION BY REFERENCE

The disclosure of Japanese Patent Application No. 2015-230727 filed on Nov. 26, 2015 including the specification, drawings and abstract is incorporated herein by reference in its entirety.

BACKGROUND

1. Technical Field

The disclosure relates to an image display apparatus.

2. Description of Related Art

Japanese Patent Application Publication No. 2001-199295 (JP 2001-199295A) describes a running state display apparatus that displays a stability of an autonomous driving control to a driver during the autonomous driving control of a vehicle. The running state display apparatus determines a stability of the autonomous driving control based on environmental information around the vehicle, and shows, to an occupant (including the driver) of the vehicle, an image that changes according to a stability determination result.

SUMMARY

The abovementioned apparatus displays information about the stability of the autonomous driving control to the occupant during the autonomous driving control of the vehicle. However, in the vehicle during the autonomous driving control, it is desirable to notify the occupant of information about the autonomous driving control including information other than the stability. Besides, it is required to notify the occupant of these pieces of information as an image that is easily understandable for the occupant of the vehicle.

In view of this, in the technical field, it is desired to provide an image display apparatus that can display an image related to an autonomous driving control in a way that an occupant can easily understand the image.

One aspect of the disclosure relates to an image display apparatus for displaying an image related to an autonomous driving control of an autonomous driving system of a vehicle on a display surface of an in-vehicle display of the vehicle based on information acquired from the autonomous driving system. The image display apparatus includes: a stability information acquisition portion configured to acquire stability information about a stability of the autonomous driving control from the autonomous driving system; a subsequent action information acquisition portion configured to acquire, from the autonomous driving system, subsequent action information about a subsequent action of the vehicle by the autonomous driving control; and a display control portion configured to control displaying of the in-vehicle display. When the vehicle is in the autonomous driving control, the display control portion is configured to display: a traveling road overlook image showing the vehicle and a traveling road where the vehicle runs in a bird's-eye view; a stability display image positioned in a traveling direction of the vehicle in the traveling road overlook image, the stability display image being configured to change according to the stability information inside a rectangular frame extending in a direction intersecting with the travelling direction; and a subsequent action text image positioned in the traveling direction relative to the stability display image and indicative of the subsequent action information.

In the image display apparatus according to the above aspect, the stability display image and the subsequent action text image are displayed in the traveling direction of the vehicle in the traveling road overlook image. Accordingly, when an occupant (including a driver) of the vehicle looks at the traveling direction of the vehicle in the traveling road overlook image, the occupant can easily recognize the stability display image and the subsequent action text image visually without looking for them. Besides, according to the image display apparatus, the stability of the autonomous driving control is shown by changing the stability display image, so that the occupant can easily understand the stability intuitively. In view of this, the image display apparatus can display the images related to the autonomous operation control in a way that the occupant can easily understand the images.

In the above aspect, the image display apparatus may further include an action reason information acquisition portion configured to acquire, from the autonomous driving system, action reason information about a reason of the subsequent action of the vehicle by the autonomous driving control. Further, when the action reason information acquisition portion acquires the action reason information during the autonomous driving control of the vehicle, the display control portion may be configured to display an action reason text image indicative of the action reason information on a left side or a right side relative to the stability display image on the display surface. According to the image display apparatus, the action reason text image is displayed on the left side or the right side relative to the stability display image, thereby allowing the occupant of the vehicle to easily understand the reason of the subsequent action of the vehicle by the autonomous driving control.

In the above aspect, the stability information acquisition portion may be configured to acquire decrease reason information about a reason of a decrease in the stability from the autonomous driving system, and when the stability information acquisition portion acquires the decrease reason information during the autonomous driving control of the vehicle, the display control portion may be configured to display a decrease reason text image indicative of the decrease reason information at a position in the traveling direction relative to the stability display image. According to the image display apparatus, the decrease reason text image indicative of the decrease reason information about a reason why the stability of the autonomous driving control decreases is displayed. This allows the occupant of the vehicle to easily understand the reason of the decrease in the stability. Besides, the image display apparatus displays the decrease reason text image at a position in the traveling direction of the vehicle relative to the stability display image. Accordingly, when the occupant of the vehicle just looks at the traveling direction of the vehicle in the traveling road overlook image, the occupant can easily visually recognize the decrease reason text image.

As described above, according to the image display apparatus of the disclosure, it is possible to display the images related to the autonomous operation control in a way that the occupant can easily understand the images.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is another example of the image related to the autonomous driving control displayed by the image display apparatus illustrated in FIG. 1;

FIG. 5 is a flowchart illustrating a display control process of the image display device;

FIG. 6A is a flowchart illustrating an action reason display process of the image display apparatus; and FIG. 6B is a flowchart illustrating a decrease reason display process of the image display apparatus.

DETAILED DESCRIPTION OF EMBODIMENTS

An embodiment of the disclosure will be described below with reference to the drawings.

Figure 1:
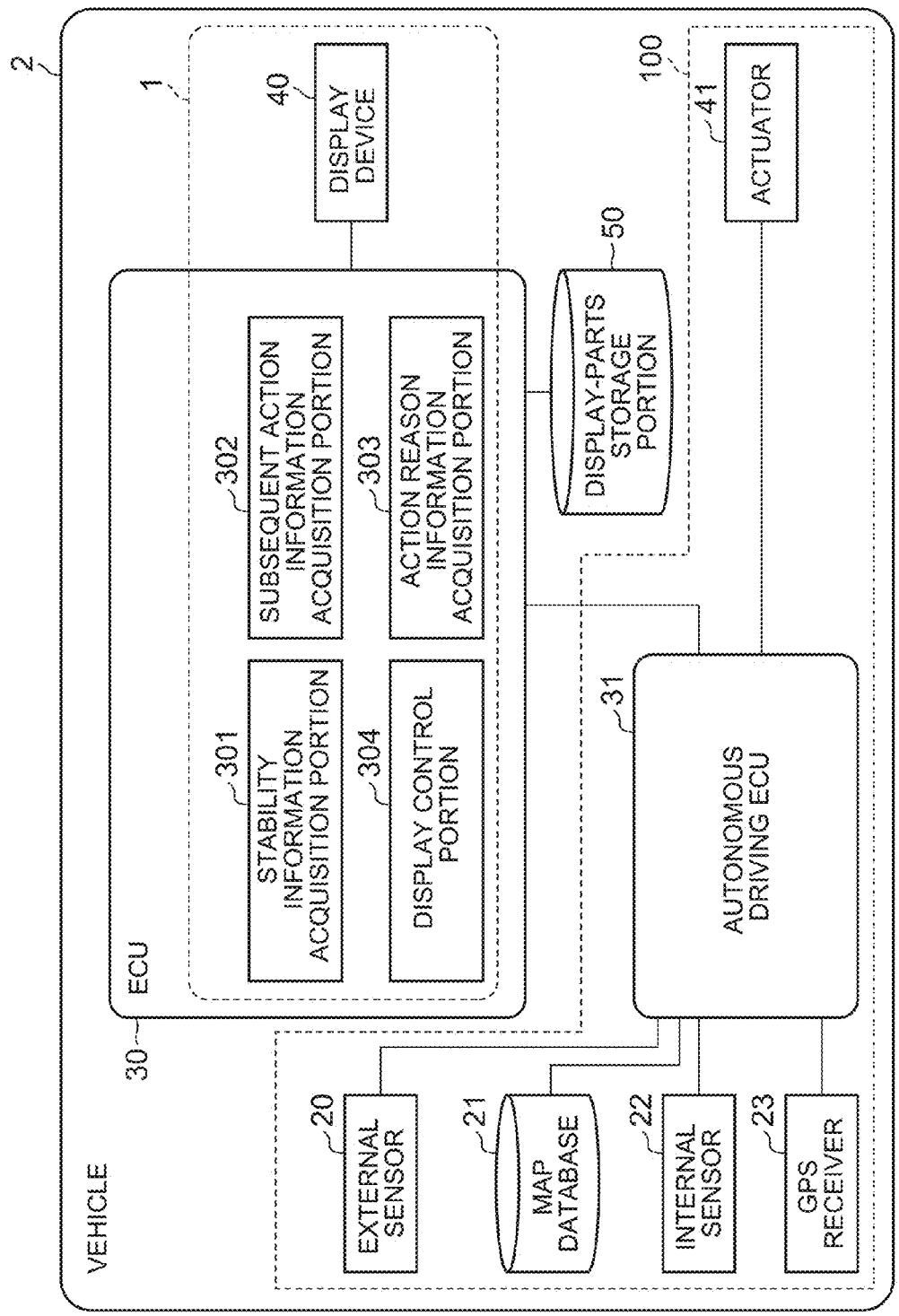
FIG. 1 is a block diagram illustrating an image display apparatus and an autonomous driving system according to the present embodiment.

FIG. 1 is a block diagram illustrating an image display apparatus and an autonomous driving system according to the present embodiment. As illustrated in FIG. 1, an image display apparatus 1 and an autonomous driving system 100 are provided in a vehicle 2 such as a passenger car.

First described is a configuration of the autonomous driving system 100. The autonomous driving system 100 is a system for performing an autonomous driving control of the vehicle 2. The autonomous driving control is a vehicle control to cause the vehicle 2 to automatically run along a road where the vehicle 2 runs without a driver performing a driving operation. The autonomous driving system 100 starts the autonomous driving control of the vehicle 2 when a start operation (an operation to press a start button of the autonomous driving control, and the like operation) of the autonomous driving control is performed by the driver.

The autonomous driving system 100 includes an external sensor 20, a map database 21, an internal sensor 22, a GPS (Global Positioning System) receiver 23, an autonomous driving ECU 31, and an actuator 41.

The external sensor 20 is a detector for detecting an object around the vehicle 2. The object is a corporeal object, and is a leading vehicle, a pedestrian, or a stationary object such as a guard rail. As one example of the external sensor 20, a Laser Imaging Detection and Ranging (LIDAR) is used. The LIDAR detects an object around the vehicle 2 by use of a laser beam. As a specific example, the LIDAR transmits a laser beam in an irradiation range around the vehicle 2. In a case where there is an object that reflects the laser beam within the irradiation range, the LIDAR receives reflection light. The LIDAR detects a relative distance between the vehicle 2 and the object based on a time required before the emitted laser beam returns as the reflection light. The LIDAR detects a relative velocity between the vehicle 2 and the object based on a frequency change of the reflection light. The LIDAR detects a direction of the object based on an angle of the reflection light. The LIDAR transmits a detection result to the autonomous driving ECU 31. Note that the external sensor 20 may use a camera. The external sensor 20 is also used for white line recognition of a driving lane where the vehicle 2 runs.

The map database 21 is a database including map information. The map database 21 is stored in a storage portion (not shown) provided in the vehicle 2. The map information includes positional information of roads, road-shape information (a curve, a type of a linear part, a curvature of the curve, and the like), positional information of intersections and forks, positional information of buildings, and the like information.

The internal sensor 22 is a detector for detecting a running state of the vehicle 2. The internal sensor 22 includes a vehicle speed sensor, an acceleration sensor, and a yaw rate sensor. The vehicle speed sensor is a detector for detecting a speed of the vehicle 2. An example of the vehicle speed sensor used herein is a wheel speed sensor provided for wheel assemblies of the vehicle 2 or a drive shaft or the like rotating together with the wheel assemblies and configured to detect a rotation speed of the wheel assemblies. The vehicle speed sensor transmits detected vehicle speed information of the vehicle 2 to the autonomous driving ECU 31. The acceleration sensor is a detector for detecting an acceleration of the vehicle 2. The acceleration sensor includes a front-rear acceleration sensor for detecting an acceleration of the vehicle 2 in a front-rear direction, and a lateral acceleration sensor for detecting a lateral acceleration of the vehicle 2. The acceleration sensor transmits detected acceleration information of the vehicle 2 to the autonomous driving ECU 31. The yaw rate sensor is a detector for detecting a yaw rate (a rotation angular velocity) around a vertical axis of a centroid of the vehicle 2. A gyro sensor is used as an example of the yaw rate sensor. The yaw rate sensor transmits detected yaw rate information of the vehicle 2 to the autonomous driving ECU 31.

The GPS receiver 23 measures a position of the vehicle 2 by receiving signals from three or more GPS satellites. A specific example of the position is latitude and longitude. The GPS receiver 23 transmits measured positional information of the vehicle 2 to the autonomous driving ECU 31.

The actuator 41 is a device for performing a running control of the vehicle 2. The actuator 41 includes an engine actuator, a brake actuator, and a steering actuator. The engine actuator controls a driving force of the vehicle 2 by changing a supply amount of the air to the engine according to a control signal from the autonomous driving ECU 31. As a specific example, the engine actuator controls a driving force of the vehicle 2 by changing a throttle opening degree. Note that, in a case where the vehicle 2 is a hybrid vehicle or an electric vehicle, the engine actuator controls a driving force of a motor as a power source. The brake actuator controls a braking system according to a control signal from the autonomous driving ECU 31 and controls a braking force to be given to the wheel assemblies of the vehicle 2. As the braking system, a hydraulic brake system can be used. The steering actuator controls driving of an assist motor for controlling a steering torque, among electric power steering systems, according to a control signal from the autonomous driving ECU 31. The steering actuator hereby controls the steering torque of the vehicle 2.

The autonomous driving ECU 31 is an electronic control unit including a CPU, a ROM, a RAM, a CAN communications circuit, and the like. The autonomous driving ECU 31 controls hardware based on a signal output from the CPU, thereby implementing a function of the after-mentioned autonomous driving ECU 31. As an example of a more specific operation, the autonomous driving ECU 31 operates the CAN communications circuit to input/output data, so as to store input data in the RAM, and then loads a program stored in the ROM to the RAM so that the program thus loaded to the RAM is executed.

The autonomous driving ECU 31 is configured to refer to the map database 21. Based on the map information of the map database 21, the autonomous driving ECU 31 generates a running plan (a running plan that depends on map information) to cause the vehicle 2 to run to its destination by an autonomous driving control. The destination may be a destination set by the driver, or may be a destination proposed by the autonomous driving system 100. The autonomous driving ECU 31 can generate the running plan by a well-known technique.

Further, the autonomous driving ECU 31 acquires a road environment information (including object information) around the vehicle 2 from a detection result of the external sensor 20. The autonomous driving ECU 31 acquires information of a running state of the vehicle 2 from a detection result of the internal sensor 22. The autonomous driving ECU 31 acquires positional information of the vehicle 2 from a measurement result of the GPS receiver 23.

The autonomous driving ECU 31 is connected to the actuator 41 so as to control the actuator 41 to perform an autonomous driving control of the vehicle 2. The autonomous driving ECU 31 controls the actuator 41 to perform the autonomous driving control of the vehicle 2, based on the running plan of the vehicle 2 to the destination, the road environment around the vehicle 2, the running state of the vehicle 2, and the positional information of the vehicle 2. The autonomous driving control is a control to cause the vehicle 2 to automatically run along a road where the vehicle 2 runs. The autonomous driving control includes automatic steering and automatic speed adjustment. The automatic steering is a control to automatically perform the steering of the vehicle 2. The automatic speed adjustment is a control to automatically adjust a speed of the vehicle 2.

Further, during the autonomous driving control, the autonomous driving ECU 31 calculates a stability of the autonomous driving control. The stability of the autonomous driving control is an index to be used for a determination on whether or not the autonomous driving control can be continued. When the stability becomes a control stop threshold or less, the autonomous driving ECU 31 stops the autonomous driving control. The control stop threshold is a threshold based on which it is determined whether or not it is necessary to stop the autonomous driving control. The control stop threshold is a fixed value that is set in advance.

When the autonomous driving ECU 31 cannot acquire information of a white line of the road from the detection result of the external sensor 20, the autonomous driving ECU 31 calculates the stability as a lower value in comparison with a case where the information of the white line of the road can be acquired. When the white line of the road is hidden by another vehicle or a structural object (a power pole, a wall, a building, and the like) around the vehicle 2, the autonomous driving ECU 31 may calculate the stability by use of a ratio of the white line thus hidden. The ratio of the white line thus hidden can be found by a well-known image processing technique. Note that the autonomous driving ECU 31 may calculate the stability by a well-known technique.

Further, when a detection range of the external sensor 20 is limited by another vehicle or a structural object around the vehicle 2, the autonomous driving ECU 31 may calculate the stability as a lower value in comparison with a case where the detection range of the external sensor 20 is not limited. The autonomous driving ECU 31 may calculate the stability by use of a ratio between the not-limited detection range of the external sensor 20 and a limited range of the external sensor 20 by another vehicle or a structural object (a range hidden by another vehicle or a structural object). The limited range of the external sensor 20 by another vehicle or a structural object can be found by a well-known technique.

Further, the autonomous driving ECU 31 monitors an operation period of the autonomous driving system 100, and when it is determined that the operation period exceeds a predetermined threshold, the autonomous driving ECU 31 may calculate the stability as a lower value in comparison with a case where it is determined that the operation period does not exceed the predetermined threshold. Instead of an entire operation period of autonomous driving system 100, an operation period of a specific process block (e.g., a process block of white line detection) may be used.

Further the autonomous driving ECU 31 may calculate the stability based on a weather state. When a wiper of the vehicle 2 operates, the autonomous driving ECU 31 may calculate the stability as a lower value in comparison with a case where the wiper does not operate. In a case where information of the weather state can be acquired via wireless communication, when the weather state is bad (rain, snow, fog, or the like), the autonomous driving ECU 31 may calculate the stability as a lower value in comparison with a case where the weather state is fine. When any problem that disturbs continuation of the autonomous driving control, such as the bad weather, is not detected, the autonomous driving ECU 31 calculates the stability as an initial value (a preset setting value).

The autonomous driving ECU 31 transmits the stability thus calculated to the image display apparatus 1 as stability information. The stability information is information about the stability of the autonomous driving control. Note that the stability information is not necessarily a value of the stability. Other examples of the stability information will be described later.

When the stability decreases to be less than the initial value, the autonomous driving ECU 31 transmits, to the image display apparatus 1, decrease reason information about a reason of the decrease in the stability. The decrease reason information includes information about a state (the road environment of the vehicle 2, and the like) that causes the decrease in the stability. The decrease reason information includes information of existence of another vehicle or a structural object around the vehicle 2, an increase in operation load of the autonomous driving system 100, bad weather, and the like. The decrease reason information may include information of a plurality of states.

Note that the autonomous driving ECU 31 may not transmit the decrease reason information only because the stability is decreased to be less than the initial value, and when the stability becomes less than a preset threshold, the autonomous driving ECU 31 may transmit the decrease reason information to the image display apparatus 1. Further, the autonomous driving ECU 31 may be configured not to transmit the decrease reason information to the image display apparatus 1.

The autonomous driving ECU 31 transmits, to the image display apparatus 1, subsequent action information about a subsequent action of the vehicle 2 by the autonomous driving control, in addition to the stability information and the decrease reason information. The subsequent action information is information about the subsequent action of the vehicle 2 by the autonomous driving control. The subsequent action information includes information about acceleration, deceleration, lane-changing, stop of the autonomous driving control, or end of the autonomous driving control of the vehicle 2.

The autonomous driving ECU 31 determines whether or not a subsequent action determination condition of the vehicle 2 by the autonomous driving control is satisfied, based on the running plan of the vehicle 2 to the destination, the road environment around the vehicle 2, the running state of the vehicle 2, and the positional information of the vehicle 2. The subsequent action determination condition includes various conditions to determine the subsequent action of the vehicle 2 by the autonomous driving control. The subsequent action determination condition is set in advance. That the subsequent action determination condition is satisfied means that a reason (a reason to perform the subsequent action) of the subsequent action of the vehicle 2 by the autonomous driving control has occurred. The reason of the subsequent action is, for example, a state (the road environment around the vehicle 2, and the like) based on which the subsequent action of the vehicle 2 by the autonomous driving control is determined to be performed. The autonomous driving ECU 31 transmits, to the image display apparatus 1, action reason information about the reason of the subsequent action of the vehicle 2 by the autonomous driving control. The autonomous driving ECU 31 transmits, to the image display apparatus 1, the action reason information and the subsequent action information in association with each other.

When the vehicle 2 runs on a central traffic lane among three traffic lanes on one side and there is a junction where the central traffic lane and a left traffic lane merge into one in a predetermined distance (e.g., 500 m) ahead, the autonomous driving ECU 31 determines that a determination condition of lane-changing (the subsequent action of the vehicle 2 by the autonomous driving control) is satisfied. In this case, the autonomous driving ECU 31 transmits, to the image display apparatus 1, information about the lane-changing from the central traffic lane among three traffic lanes on one side to a right traffic lane as the subsequent action information. Further, the autonomous driving ECU 31 transmits, to the image display apparatus 1, information about the merging with the left traffic lane, as the action reason information.

When there is a speed limit in a zone ahead from the vehicle 2 by a given distance (e.g., 500 m), the autonomous driving ECU 31 determines that a determination condition of deceleration of the vehicle 2 is satisfied. Information about the speed limit is included in the map information. In this case, the autonomous driving ECU 31 transmits, to the image display apparatus 1, information about the deceleration of the vehicle 2 as the subsequent action information. Further, the autonomous driving ECU 31 transmits, to the image display apparatus 1, information about the speed limit as the action reason information. Note that the autonomous driving ECU 31 may acquire the information about the speed limit via communication with a traffic information control center that manages traffic information.

When it is determined that the stability becomes less than a control stop threshold, the autonomous driving ECU 31 determines that a determination condition of stop of the autonomous driving control of the vehicle 2 is satisfied. In this case, the autonomous driving ECU 31 transmits, to the image display apparatus 1, information about the stop of the autonomous driving control of the vehicle 2 as the subsequent action information.

Further, the autonomous driving ECU 31 transmits, to the image display apparatus 1, information about a reason of the stop of the autonomous driving control as the action reason information. The reason of the stop of the autonomous driving control may be a bad weather under which the driving control cannot be continued, a road structure on which the autonomous driving control cannot be continued, a surrounding state in which the autonomous driving control cannot be continued, and the like.

The autonomous driving ECU 31 acquires weather information in a travelling direction of the vehicle 2 via communication with the traffic information control center. In a case of typhoon, heavy snow, and the like, the autonomous driving ECU 31 determines that it is a bad weather under which the autonomous driving control cannot be continued. When there is no white line constituting a traffic lane, the autonomous driving ECU 31 determines that the vehicle 2 runs on a road structure on which the autonomous driving control cannot be continued. When there is another vehicle or the like rolled over due to an accident, the autonomous driving ECU 31 determines that it is a surrounding state in which the autonomous driving control cannot be continued. The reason of the stop of the autonomous driving control may be the same as the reason of the decrease in the stability. Note that the autonomous driving ECU 31 may be configured not to transmit the action reason information to the image display apparatus 1.

Next will be described a configuration of the image display apparatus 1 according to the present embodiment. When the vehicle 2 is in the autonomous driving control, the image display apparatus 1 displays an image related to the autonomous driving control to the occupant (including the driver) of the vehicle 2. Based on the information acquired from the autonomous driving system 100, the image display apparatus 1 displays the image related to the autonomous driving control on a display device (an in-vehicle display) 40 described below.

The information acquired from the autonomous driving system 100 includes the stability information, the decrease reason information, the subsequent action information, and the action reason information, which have been described above. Further, the information acquired from the autonomous driving system 100 also includes information (information about other vehicles around the vehicle 2, and the like) of the road environment around the vehicle 2, and information (information of the number of traffic lanes of the road, and the like) about the traveling road where the vehicle 2 runs.

The image display apparatus 1 includes at least part of the ECU 30 provided in the vehicle 2 and the display device 40. The ECU 30 is an electronic control unit including a Central Processing Unit (CPU), a Read Only Memory (ROM), a Random Access Memory (RAM), a Controller Area Network (CAN) communications circuit, and so on. The ECU 30 controls the display device 40. Further, the ECU 30 is connected to a display-parts storage portion 50 in which to store parts of an image.

The display device 40 is a display provided in the vehicle to display an image in a display region. The image is a figure displayed in the display region. The display device 40 is controlled by the ECU 30 so as to display an image in the display region. A display that can display a color image is used as the display device 40. As an example of the display device 40, a head-up display is used. The head-up display is a display that displays information in an overlapping manner with a view field of the driver of the vehicle 2. The head-up display has a projector portion placed in an instrument panel of the vehicle 2. The projector portion projects an image on a display surface of a front windshield (an inner reflecting surface of the front windshield) through an opening provided in the instrument panel. The driver can recognize the image visually based on the reflection on the display surface. The display region of the head-up display is a region set in advance in the front windshield, and is a range where the image is projected.

The following describes a function of the ECU 30. As illustrated in FIG. 1, the ECU 30 includes a stability information acquisition portion 301, a subsequent action information acquisition portion 302, an action reason information acquisition portion 303, and a display control portion 304.

The stability information acquisition portion 301 acquires stability information from the autonomous driving system 100. When the vehicle 2 starts the autonomous driving control, the stability information acquisition portion 301 acquires the stability information from the autonomous driving system 100.

When the stability information acquisition portion 301 acquires a value of the stability as the stability information from the autonomous driving system 100, the stability information acquisition portion 301 determines which range the stability falls under, a normal range, a cautious range, or an unstable range. The normal range is a stability range in which the autonomous driving control can be continued normally. The unstable range is a stability range in which the continuation of the autonomous driving control is unstable. The cautious range is a range between the normal range and the unstable range.

When the stability is a first threshold or more, the stability information acquisition portion 301 determines that the stability falls under the normal range. When the stability is less than a second threshold, which is smaller than the first threshold, the stability information acquisition portion 301 determines that the stability falls under the unstable range. The first threshold and the second threshold are thresholds to determine a range under which the stability falls. The first threshold and the second threshold are fixed values set in advance. When the stability is less than the first threshold but not less than the second threshold, the stability information acquisition portion 301 determines that the stability falls under the cautious range. Note that the second threshold is set as a value larger than the control stop threshold to determine whether or not it is necessary to stop the autonomous driving control.

Note that the autonomous driving system 100 may determine which range the stability falls under, the normal range, the cautious range, or the unstable range. In this case, the stability information acquisition portion 301 can acquire information of the range under which the stability falls, as the stability information.

The stability information acquisition portion 301 acquires decrease reason information about a reason of a decrease in the stability, from the autonomous driving system 100. When the calculated stability decreases to be lower than the initial value, the autonomous driving system 100 transmits the decrease reason information to the stability information acquisition portion 301.

When it is determined that the stability falls under the cautious range or the unstable range, the stability information acquisition portion 301 may request the decrease reason information to the autonomous driving system 100. The stability information acquisition portion 301 acquires the decrease reason information transmitted from the autonomous driving system 100 in response to the request. Note that the stability information acquisition portion 301 may not necessarily acquire the decrease reason information.

The subsequent action information acquisition portion 302 acquires, from the autonomous driving system 100, subsequent action information about a subsequent action of the vehicle 2 by the autonomous driving control. The action reason information acquisition portion 303 acquires action reason information about a reason of the subsequent action of the vehicle 2 from the autonomous driving system 100. When there is action reason information associated with the subsequent action information that the subsequent action information acquisition portion 302 acquires, the action reason information acquisition portion 303 acquires the action reason information. Note that the action reason information is not added to all pieces of subsequent action information. Further, the action reason information may not necessarily be acquired. In this case, the action reason information acquisition portion 303 is also unnecessary.

The display control portion 304 controls displaying of the display device 40. When the vehicle 2 is in the autonomous driving control, the display control portion 304 displays an image related to the autonomous driving control on the display surface of the front windshield. The display control portion 304 displays the image by use of display parts stored in the display-parts storage portion 50.

Figure 2:
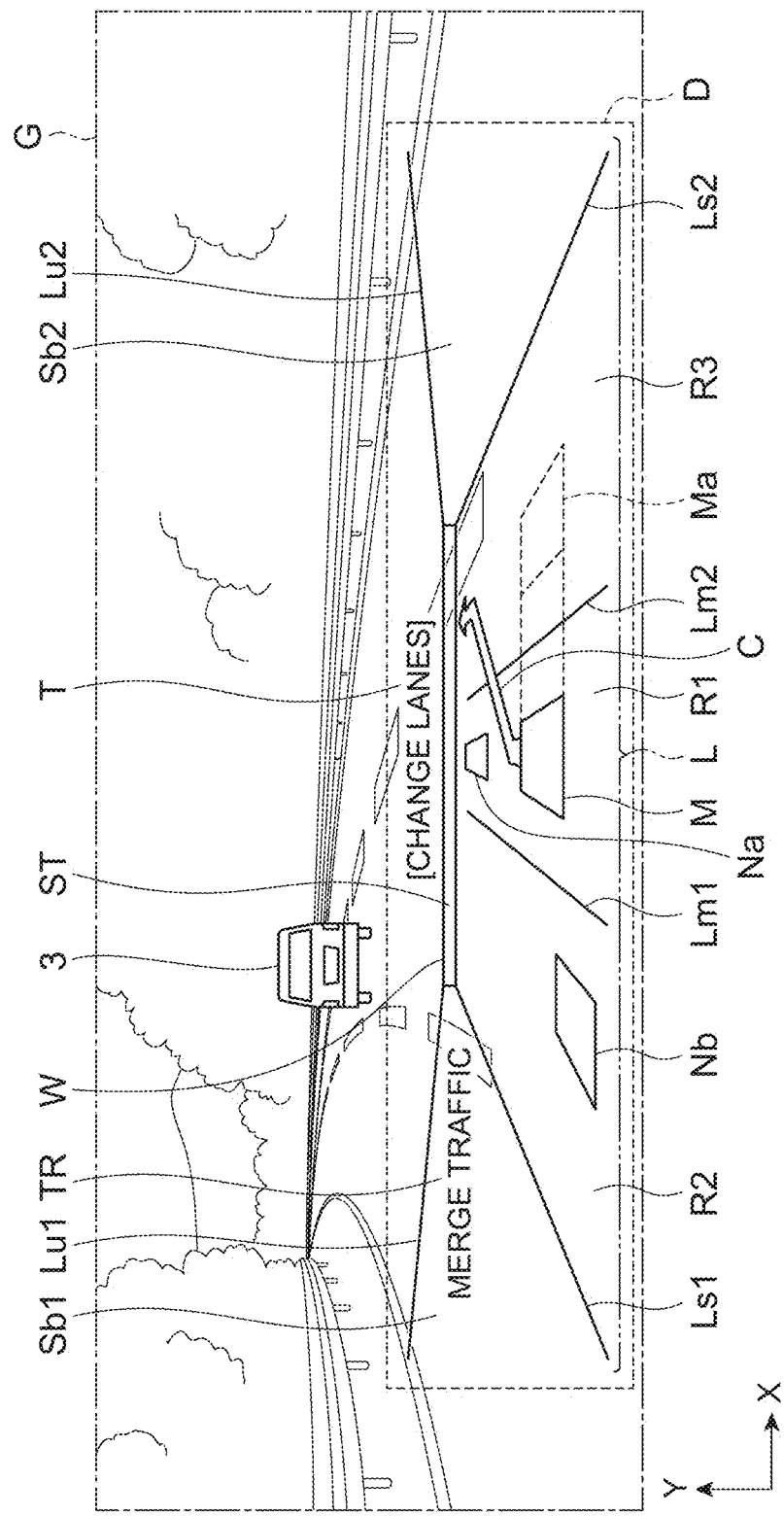
FIG. 2 is an example of an image related to an autonomous driving control and displayed by the image display apparatus illustrated in FIG. 1.

Here, FIG. 2 is an example of the image related to the autonomous driving control displayed by the image display apparatus (the display control portion 304) illustrated in FIG. 1. In FIG. 2, a display surface G of the front windshield is illustrated. A display region D of the head-up display is set in the display surface G. The display region D is placed in front of the driver. In FIG. 2, a XY rectangular coordinate system is shown with a lateral direction (a width direction of the vehicle 2) of the display surface G, seen from the driver, being taken along an X-axis direction, and a longitudinal direction (a vertical direction of the vehicle 2) of the display surface G, seen from the driver, being taken along a Y-axis direction.

In the display region D illustrated in FIG. 2, a traveling road overlook image L, a stability display image ST, a subsequent action text image T, an action reason text image TR are displayed.

First described is the traveling road overlook image L. The traveling road overlook image L is an image illustrating the vehicle 2 and the traveling road where the vehicle 2 runs, in a bird's-eye view. The traveling road overlook image L is displayed so as to overlook the traveling road from a rear upper side relative to the vehicle 2. In FIG. 2, the traveling road overlook image L includes: division line objects Lm1, Lm2 indicative of division lines of the traveling road on which the vehicle 2 runs and which has three traffic lanes on each side; and traffic zone boundary line object Ls1, Ls2 indicative of vehicle traffic zone boundary lines of the traveling road. In the traveling road overlook image L, a region between the division line objects Lm1, Lm2 corresponds to a driving lane R1 on which the vehicle 2 runs. Further, a region between the division line object Lm1 and the traffic zone boundary line object Ls1 corresponds to a left adjacent traffic lane R2 with respect to the driving lane R1. A region between the division line object Lm2 and the traffic zone boundary line object Ls2 corresponds to a right adjacent traffic lane R3 with respect to the driving lane R1. If the number of traffic lanes of the traveling road where the vehicle 2 runs changes, the traveling road overlook image L also changes. This point will be described later more specifically.

Further, the traveling road overlook image L illustrated in FIG. 2 also includes a vehicle object M indicative of the vehicle 2, a leading vehicle object Na indicative of a leading vehicle 3 with respect to the vehicle 2, and an adjacent vehicle object Nb indicative of an adjacent vehicle with respect to the vehicle 2. In the traveling road overlook image L illustrated in FIG. 2, a travelling direction (a depth direction) of the vehicle object M illustrated on the display surface G is along a longitudinal direction (an upper direction, the Y-axis direction) of the display surface G. Note that the travelling direction of vehicle object M may not necessarily accord with the longitudinal direction of the display surface G. Further, the travelling direction of the vehicle object M does not change on the traveling road overlook image L.

The display control portion 304 displays the leading vehicle object Na and the adjacent vehicle object Nb based on information of other vehicles around the vehicle 2. The information is acquired from the autonomous driving system 100. When there is no leading vehicle 3, the display control portion 304 does not display the leading vehicle object Na. When an inter-vehicle distance between the vehicle 2 and the leading vehicle 3 is a predetermined distance (e.g., 100 m, 200 m) or less, the display control portion 304 displays the leading vehicle object Na. A distance between the vehicle object M and the leading vehicle object Na in the traveling road overlook image L is uniform. The display control portion 304 may change the distance between the vehicle object M and the leading vehicle object Na according to an actual inter-vehicle distance between the vehicle 2 and the leading vehicle 3.

Similarly, when there is no adjacent vehicle, the display control portion 304 does not display the adjacent vehicle object Nb. When there is an adjacent vehicle within a predetermined distance (e.g., 100 m) in front of or behind the vehicle 2, the display control portion 304 displays the adjacent vehicle object Nb. The display control portion 304 displays the adjacent vehicle object Nb at a corresponding position in the adjacent traffic lane R2, R3 where the adjacent vehicle exists.

Further, the display control portion 304 determines whether the adjacent vehicle is positioned ahead of the vehicle 2 or behind the vehicle 2, or whether the adjacent vehicle and the vehicle 2 travel side by side. When it is determined that the adjacent vehicle is positioned ahead of the vehicle 2, the display control portion 304 displays the adjacent vehicle object Nb at a position ahead (in the depth direction) of the vehicle object M within an adjacent traffic lane in the traveling road overlook image L. When it is determined that the adjacent vehicle is positioned behind the vehicle 2, the display control portion 304 displays the adjacent vehicle object Nb at a position behind (near side relative to) the vehicle object M within an adjacent traffic lane in the traveling road overlook image L. When it is determined that the adjacent vehicle and the vehicle 2 travel side by side, the display control portion 304 displays the adjacent vehicle object Nb at a position adjacent to the vehicle object M within an adjacent traffic lane in the traveling road overlook image L. Thus, the traveling road overlook image L can show, to the occupant, a state of other vehicles around the vehicle 2 during the autonomous driving control.

Further, the traveling road overlook image L illustrated in FIG. 2 includes an arrow object C indicative of lane-changing of the vehicle object M by an arrow, and a vehicle projection object Ma that is a projection of the vehicle object M on the adjacent traffic lane R3 to which the vehicle object M is to change its lane. The arrow object C and the vehicle projection object Ma indicate that the subsequent action of the vehicle 2 during the autonomous driving control is lane-changing to the right adjacent traffic lane R3. The display control portion 304 displays the arrow object C and the vehicle projection object Ma based on the subsequent action information that the subsequent action information acquisition portion 302 has acquired. Thus, the traveling road overlook image L can also show, to the occupant, the subsequent action of the vehicle 2 during the autonomous driving control. Note that the arrow object C does not indicate the travelling direction of the vehicle object M. The traveling direction of the vehicle object M in the traveling road overlook image L does not change.

Next will be described the stability display image ST. The stability display image ST is displayed within a frame W. The frame W is positioned in the traveling direction of the vehicle object M in the traveling road overlook image L. The frame W is a rectangular object extending in a direction (the X-axis direction) perpendicular to the traveling direction of the vehicle object M. The frame W extends over three traffic lanes of the driving lane R1, the adjacent traffic lane R2, and the adjacent traffic lane R3 in the traveling road overlook image L.

Note that the length of the frame W in the lateral direction (the X-axis direction) may be changed according to the number of traffic lanes. Even in this case, a positional relationship between the frame W and the vehicle object M does not change. Further, the frame W is not limited to a rectangular shape. The frame W may be a rectangular object extending in the direction perpendicular to the traveling direction of the vehicle object M. The frame W may be an oblong shape or an elliptical shape.

The stability display image ST is an image changing according to the stability information of the autonomous driving system 100. The stability display image ST occupies a whole inner region of the frame W. The stability display image ST shows the stability of the autonomous driving control to the occupant by changing at least one of a color and a display mode. The display control portion 304 may show the stability of the autonomous driving control to the occupant by changing the color according to the stability information. When the stability information acquisition portion 301 determines that the stability falls under the normal range, the display control portion 304 displays the stability display image ST as a blue image. In this case, the inside of the frame W is fully blue. Note that green may be employed instead of blue. When the stability information acquisition portion 301 determines that the stability falls under the cautious range, the display control portion 304 displays the stability display image ST as an orange image. Note that umber may be employed instead of orange. When the stability information acquisition portion 301 determines that the stability falls under the unstable range, the display control portion 304 displays the stability display image ST as a red image.

The display control portion 304 may show the stability of the autonomous driving control to the occupant by changing a lighting state (the display mode) according to the stability information. When the stability information acquisition portion 301 determines that the stability falls under the normal range, the display control portion 304 may set the display mode of the stability display image ST to a lighting state. In the lighting state, blinking of the stability display image ST is not performed. When the stability information acquisition portion 301 determines that the stability falls under the cautious range, the display control portion 304 may set the display mode of the stability display image ST to a slow blinking state. In the slow blinking state, a whole inner region of the frame W blinks every predetermined time (e.g., two seconds). When the stability information acquisition portion 301 determines that the stability falls under the unstable range, the display control portion 304 may set the display mode of the stability display image ST to a quick blinking state. In the quick blinking state, the whole inner region of the frame W blinks every predetermined time (e.g., one second). The color of the stability display image ST is not limited particularly. The color of the stability display image ST may be one or may change according to the stability information.

Figure 3A:
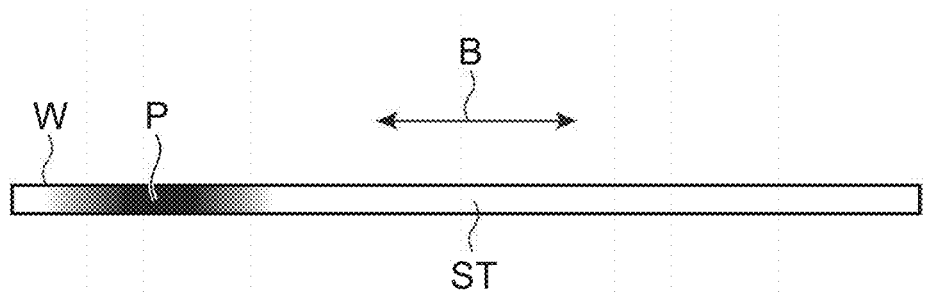
FIG. 3A is a view to describe a state where a lighting object is positioned on a left side in a stability display image illustrated in FIG. 2.
Figure 3B:
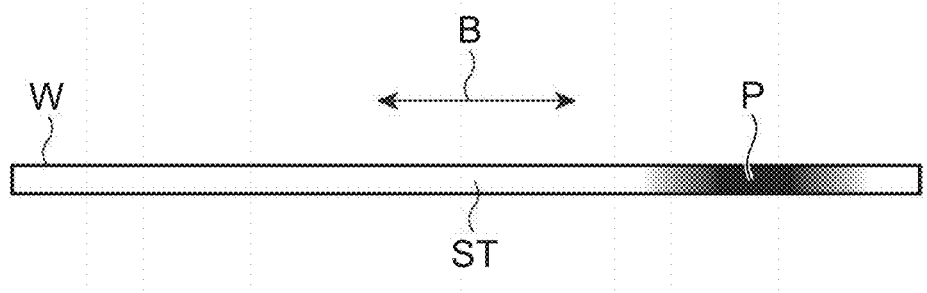
FIG. 3B is a view to describe a state where the lighting object is positioned on a right side in the stability display image illustrated in FIG. 2.

The display control portion 304 may show the stability of the autonomous driving control to the occupant by changing a movement pattern (the display mode) of a lighting object according to the stability information. Here, FIG. 3A is a view to describe a state where the lighting object moves toward the left side in the stability display image ST illustrated in FIG. 2. FIG. 3B is a view to describe a state where the lighting object moves toward the right side. The lighting object P in the stability display image ST is illustrated in FIGS. 3A and 3B. A part except for the lighting object P in the stability display image ST is transparent and is not colored. The lighting object P moves inside the frame W from side to side along a direction of an arrow B. The lighting object P is displayed in a mode (a mode with gradations) in which luminance gradually decreases toward ends on the right and left sides. The color of the lighting object P is not limited particularly. The color of the lighting object P may be one or may change according to the stability information.

In this case, when the stability information acquisition portion 301 determines that the stability falls under the normal range, the display control portion 304 sets the display mode of the stability display image ST to a mode in which the lighting object P moves from side to side in a given rhythm (a rhythm at a constant moving speed). When the stability information acquisition portion 301 determines that the stability falls under the cautious range, the display control portion 304 sets the display mode of the stability display image ST to a mode in which the lighting object P moves from side to side in an unstable rhythm (a rhythm at a changing moving speed). When the stability information acquisition portion 301 determines that the stability falls under the unstable range, the display control portion 304 sets the display mode of the stability display image ST to a mode in which the whole inner region of the frame W blinks without the moving lighting object P.

Note that the display control portion 304 may change the display mode of the stability display image ST according to a magnitude of the moving speed of the lighting object P. For example, when the stability information acquisition portion 301 determines that the stability falls under the normal range, the display control portion 304 sets the display mode of the stability display image ST to a mode in which the lighting object P moves from side to side in a given quick rhythm. When the stability information acquisition portion 301 determines that the stability falls under the cautious range, the display control portion 304 sets the display mode of the stability display image ST to a mode in which the lighting object P moves from side to side in a given slow rhythm.

In terms of the change of the stability display image ST, the display control portion 304 may use the color change and the change of the display mode (the change of the lighting state, the change of the rhythm of the lighting object P) in combination. Further, the range under which the stability falls may not necessarily be divided into three ranges, i.e., the normal range, the cautious range, and the unstable range, and may be divided into two ranges of the normal range and the cautious range or two ranges of the normal range and the unstable range.

Next will be described the subsequent action text image T. The subsequent action text image T is an image indicative of subsequent action information about a subsequent action of the vehicle 2 by the autonomous driving control. When the subsequent action information acquisition portion 302 acquires subsequent action information from the autonomous driving system 100, the display control portion 304 displays a subsequent action text image T indicative of the subsequent action information. The display control portion 304 displays the subsequent action text image T as a text image written horizontally.

As illustrated in FIG. 2, the display control portion 304 displays the subsequent action text image T at a position in the traveling direction (the Y-axis direction) of the vehicle object M relative to the stability display image ST. The display control portion 304 displays the subsequent action text image T at a position on the frame W so as to be displayed along the frame W. In FIG. 2, the display control portion 304 displays a subsequent action text image T, "CHANGE LANES," based on the subsequent action information that indicates lane-changing as the subsequent action. Data of the subsequent action text image T is stored in the display-parts storage portion 50. Other examples of the subsequent action text image T include "STEADY RUNNING," "RIGHT TURN," "LEFT TURN," "ACCELERATION," "DECELERATION," "AUTONOMOUS DRIVING STOP," "AUTONOMOUS DRIVING END," and the like.

Next will be described the action reason text image TR. The action reason text image TR is an image indicative of action reason information about a reason of a subsequent action of the vehicle 2 by the autonomous driving control. When the action reason information acquisition portion 303 acquires action reason information from the autonomous driving system 100, the display control portion 304 displays an action reason text image TR indicative of the action reason information. The display control portion 304 displays the action reason text image TR in a side view area Sb1 on the left side or a side view area Sb2 on the right side relative to the stability display image ST.

The side view area Sb1 is a region on the left side relative to the stability display image ST. The side view area Sb1 is a region between an area boundary line object Lu1 extending toward a left upper side from the frame W and the traffic zone boundary line object Ls1 of the traveling road overlook image L. Similarly, the side view area Sb2 is a region on the right side relative to the stability display image ST. The side view area Sb2 is a region between an area boundary line object Lu2 extending toward a right upper side from the frame W and the traffic zone boundary line object Ls2 of the traveling road overlook image L.

In FIG. 2, the display control portion 304 displays an action reason text image TR, "MERGE TRAFFIC," in the side view area Sb1 based on the action reason information, which is a reason of the lane-changing. Note that the display control portion 304 may display the action reason text image TR in both of the left and right side view areas Sb1, Sb2.

The display control portion 304 may determine in which area the action reason text image TR is to be displayed, the left side view area Sb1 or the right side view area Sb2, based on the action reason information. In this case, the action reason information includes a direction (either of the right and left directions) in which to display the action reason text image TR. In FIG. 2, the left traffic lane and the central traffic lane merge into one lane, so the display control portion 304 displays the action reason text image TR on the left side view area Sb1.

Data of the action reason text image TR is stored in the display-parts storage portion 50. Other examples of the action reason text image TR in a case where the subsequent action is the lane-changing include "PASS LOW-SPEED VEHICLE," "FORK AHEAD," "LANE LIMITATIONS AHEAD" "OBSTACLE AVOIDANCE," and the like. Examples of the action reason text image TR in a case where the subsequent action is acceleration include "SPEED LIMIT CHANGE," and the like. Examples of the action reason text image TR in a case where the subsequent action is deceleration include "FOR MERGING VEHICLE," "SPEED LIMIT CHANGE," and the like. Examples of the action reason text image TR in a case where the subsequent action is stop of the autonomous driving control include "BAD WEATHER," "UNSUITABLE ROAD STRUCTURE," "UNSUITABLE SURROUNDING STATE," and the like. Examples of the action reason text image TR in a case where the subsequent action is end of the autonomous driving control include "ARRIVAL AT DESTINATION" and the like.

When the display control portion 304 acquires a plurality of pieces of action reason information, the display control portion 304 may display a plurality of action reason text images TR. The display control portion 304 may display a plurality of action reason text images TR as text images written horizontally and arranged vertically along the longitudinal direction (the Y-axis direction) of the display surface G in the side view areas Sb1, Sb2. Note that the display control portion 304 may not necessarily display the action reason text image TR. In this case, it is not necessary to provide the side view areas Sb1, Sb2.

Next will be described other examples of the image related to the autonomous driving control. FIG. 4 is another example of the image related to the autonomous driving control displayed by the image display apparatus 1 illustrated in FIG. 1. A traveling road overlook image L in FIG. 4 shows a state where the traveling road on which the vehicle 2 runs has one traffic lane on each side and there are no other vehicles around the vehicle 2. In the traveling road overlook image L, there is only one traffic lane on each side, so the division line objects Lm1, Lm2 are not displayed. In this case, a region between the traffic zone boundary line objects Ls1, Ls2 is the driving lane R1.

Note that, in a case where the traveling road has two traffic lanes on each side, either one of the division line objects Lm1, Lm2 is displayed. Even in this case, the vehicle object M is placed in a center of the traveling road overlook image L in the lateral direction of the display surface G. Further, in a case where the number of traffic lanes of the traveling road is three or more, the traveling road overlook image L including three traffic lanes on each side with the driving lane R1, where the vehicle 2 runs, being in the center as illustrated in FIG. 2 can be employed.

Further, in FIG. 4, the stability of the autonomous driving control falls under the unstable range, and a decrease reason text image SR is displayed. The stability display image ST illustrated in FIG. 4 is displayed as a red image as a whole. The stability display image ST may be in a quick blinking state (e.g., blinking every one second).

The decrease reason text image SR is an image indicative of decrease reason information about a reason of a decrease in the stability. When the stability information acquisition portion 301 acquires decrease reason information from the autonomous driving system 100, the display control portion 304 displays a decrease reason text image SR indicative of the decrease reason information. As illustrated in FIG. 4, the decrease reason text image SR is positioned in the traveling direction (the Y-axis direction) of the vehicle object M relative to the stability display image ST. The display control portion 304 displays the decrease reason text image SR at a position on the frame W so as to be displayed along the frame W. The display control portion 304 displays the decrease reason text image SR at the same position as the subsequent action text image T illustrated in FIG. 2. The display control portion 304 may display the subsequent action text image T and the decrease reason text image SR so as to be arranged vertically.

In FIG. 2, the display control portion 304 displays a decrease reason text image SR, "BAD WEATHER," based on decrease reason information indicating that the stability decreases due to the weather. Data of the decrease reason text image SR is stored in the display-parts storage portion 50. Other examples of the decrease reason text image SR include "UNSUITABLE ROAD STRUCTURE," "UNSUITABLE SURROUNDING STATE," and the like.

When the stability information acquisition portion 301 acquires decrease reason information from the autonomous driving system 100, the display control portion 304 displays the decrease reason text image SR. Note that, when the stability information acquisition portion 301 determines that the stability falls under the normal range, the display control portion 304 may not display the decrease reason text image SR. In this case, when the stability information acquisition portion 301 determines that the stability falls under the cautious range or the unstable range, the display control portion 304 displays the decrease reason text image SR. Further, the display control portion 304 may not necessarily display the decrease reason text image SR. In this case, the stability information acquisition portion 301 may not necessarily acquire the decrease reason information.

The following describes a display control of the image display apparatus 1. FIG. 5 is a flowchart illustrating a display control process of the image display apparatus 1. The display control process illustrated in FIG. 5 is performed when the autonomous driving control is started by the autonomous driving system 100, and the display of the image is stopped when the autonomous driving control is finished.

As illustrated in FIG. 5, the ECU 30 of the image display apparatus 1 acquires various pieces of information from the autonomous driving system 100 in S10. More specifically, the stability information acquisition portion 301 acquires stability information about the stability of the autonomous driving control. The subsequent action information acquisition portion 302 acquires subsequent action information about a subsequent action of the vehicle 2 by the autonomous driving control. The display control portion 304 acquires information of the traveling road of the vehicle 2 and information of a road environment around the vehicle 2.

In S12, the ECU 30 causes the stability information acquisition portion 301 to determine a range under which the stability falls. The stability information acquisition portion 301 determines which range the stability falls under, the normal range, the cautious range, or the unstable range, based on the stability information.

In S14, the ECU 30 causes the display control portion 304 to display images related to the autonomous driving control (the traveling road overlook image L, the stability display image ST, the subsequent action text image T). The display control portion 304 displays the traveling road overlook image L based on the information (information of the number of traffic lanes) of the traveling road of the vehicle 2 and the information (information of other vehicles) of the road environment around the vehicle 2.

The display control portion 304 displays the traveling road overlook image L including the driving lane R1 and the vehicle object M. The display control portion 304 displays the division line objects Lm1, Lm2 according to the number of traffic lanes of the traveling road of the vehicle 2. The display control portion 304 displays the leading vehicle object Na and the adjacent vehicle object Nb based on whether or not other vehicles run around the vehicle 2. Further, when the subsequent action of the vehicle 2 is lane-changing, the display control portion 304 displays the arrow object C indicative of the lane-changing and the vehicle projection object Ma based on the subsequent action information.

The display control portion 304 displays the stability display image ST based on a determination result of S12 by the stability information acquisition portion 301. The display control portion 304 displays the stability display image ST at a position in the traveling direction of the vehicle object M in the traveling road overlook image L. The display control portion 304 changes the stability display image ST based on the determination result of S12 by the stability information acquisition portion 301.

Further, the display control portion 304 displays the subsequent action text image T based on the subsequent action information. The display control portion 304 displays the subsequent action text image T at a position in the traveling direction of the vehicle object M in the traveling road overlook image L. The display control portion 304 displays the subsequent action text image T written horizontally at a position on the frame W so as to be displayed along the frame W surrounding the stability display image ST. Note that the subsequent action text image T may not be displayed at some timings.

Next will be described the display control of the image display apparatus 1. FIG. 6A is a flowchart illustrating an action reason display process of the image display apparatus 1. The action reason display process illustrated in FIG. 6A is performed when the autonomous driving control is started by the autonomous driving system 100, and the display of the image is stopped when the autonomous driving control is finished.

As illustrated in FIG. 6A, the ECU 30 of the image display apparatus 1 causes the action reason information acquisition portion 303 to acquire action reason information about a reason of a subsequent action of the vehicle 2 in S20. The action reason information is acquired in association with the subsequent action information. Note that the subsequent action information is not always associated with the action reason information.

In S22, the ECU 30 causes the display control portion 304 to display the action reason text image TR. The display control portion 304 displays the action reason text image TR in either of the side view areas Sb1, Sb2 on the left and right sides relative to the stability display image ST based on the action reason information.

Next will be described the display control of the image display apparatus 1. FIG. 6B is a flowchart illustrating a decrease reason display process of the image display apparatus 1. The decrease reason display process illustrated in FIG. 6B is performed when the autonomous driving control is started by the autonomous driving system 100, and the display of the image is stopped when the autonomous driving control is finished.

As illustrated in FIG. 6B, the ECU 30 of the image display apparatus 1 causes the stability information acquisition portion 301 to acquire decrease reason information about a reason of a decrease in the stability in S30.

In S32, the ECU 30 causes the display control portion 304 to display the decrease reason text image SR. The display control portion 304 displays the decrease reason text image SR at a position in the traveling direction of the vehicle object M in the traveling road overlook image L based on the decrease reason information. The display control portion 304 displays the decrease reason text image SR written horizontally at a position on the frame W so as to be displayed along the frame W surrounding the stability display image ST. The display control portion 304 may display the subsequent action text image T and the decrease reason text image SR so as to be arranged vertically.

In the image display apparatus 1 of the present embodiment, the stability display image ST and the subsequent action text image T are displayed in the traveling direction of the vehicle object M in the traveling road overlook image L. Accordingly, when the occupant (including the driver) of the vehicle 2 looks at the traveling direction of the vehicle object M in the traveling road overlook image L, the occupant can easily recognize the stability display image ST and the subsequent action text image T visually without looking for them. Besides, according to the image display apparatus 1, the stability of the autonomous driving control is shown by changing the stability display image ST, so that the occupant can easily understand the stability intuitively. In view of this, the image display apparatus 1 can display the image related to the autonomous driving control in a way that the occupant can easily understand the image intuitively.

Further, the image display apparatus 1 displays the action reason text image TR in the side view area Sb1 on the left side or the side view area Sb2 on the right side relative to the stability display image ST, thereby allowing the occupant of the vehicle 2 to easily understand the reason of the subsequent action of the vehicle 2 by the autonomous driving control.

Further, the image display apparatus 1 displays the decrease reason text image SR indicative of decrease reason information about a reason why the stability of the autonomous driving control decreases, thereby allowing the occupant of the vehicle 2 to easily understand the reason of the decrease in the stability. Besides, the image display apparatus 1 displays the decrease reason text image at a position in the traveling direction of the vehicle 2 relative to the stability display image. Accordingly, when the occupant of the vehicle 2 just looks at the traveling direction of the vehicle object M in the traveling road overlook image L, the occupant can easily recognize the decrease reason text image SR visually.

One preferred embodiment of the disclosure has been described above, but the disclosure is not limited to the above embodiment. The disclosure can be performed in an embodiment in which various changes and improvements are made based on the knowledge of a person skilled in the art, in addition to the above embodiment.

For example, the image display apparatus 1 may not acquire information of the traveling road from the autonomous driving system 100. The image display apparatus 1 may acquire the information of the traveling road based on the map information (including information of the number of traffic lanes of the road) of the map database 21 and positional information of the vehicle 2 in the GPS receiver 23. Similarly, the image display apparatus 1 may acquire information of the road environment based on a detection result of the external sensor 20.

Further, the image display apparatus 1 may not necessarily display the traveling road overlook image L based on the information of the traveling road or the information of the road environment. The traveling road overlook image L may be configured to display only the driving lane R1 regardless of the number of traffic lanes of the traveling road (see FIG. 4). In this case, the division line objects Lm1, Lm2 are not displayed. Further, the traveling road overlook image L may be configured to display only the vehicle object M regardless of whether or not there are any other vehicles around the vehicle 2 (see FIG. 4). In this case, the leading vehicle object Na and the adjacent vehicle object Nb are not displayed.

Further, the display device 40 is not limited to the head-up display. The display device 40 may be a liquid crystal display provided in the instrument panel or a liquid crystal display of the navigation system. In this case, the display surface G is a display surface of the liquid crystal display.

Furthermore, even in a case where the vehicle 2 is not in the autonomous driving control, the image display apparatus 1 may display the stability display image related to the stability of the autonomous driving control. This allows the occupant to consider the stability of the autonomous driving control when the autonomous driving control is started.

What is claimed is:

1. An image display apparatus for displaying an image related to an autonomous driving control of an autonomous driving system of a vehicle on a display surface of an in-vehicle display of the vehicle based on information acquired from the autonomous driving system, the image display apparatus comprising:
    a stability information acquisition portion configured to acquire stability information about a stability of the autonomous driving control from the autonomous driving system;
    a subsequent action information acquisition portion configured to acquire, from the autonomous driving system, subsequent action information about a subsequent action of the vehicle by the autonomous driving control; and
    a display control portion configured to control displaying of the in-vehicle display,
        the display control portion being configured such that, when the vehicle is in the autonomous driving control, the display control portion displays:
            a traveling road overlook image showing the vehicle and a traveling road where the vehicle runs in a bird's-eye view;
            a stability display image positioned in a traveling direction of the vehicle in the traveling road overlook image, the stability display image being configured to change according to the stability information inside a rectangular frame extending in a direction intersecting with the travelling direction; and
            a subsequent action text image positioned in the traveling direction relative to the stability display image and indicative of the subsequent action information, the subsequent action text image being written horizontally at a position above the rectangular frame so as to be displayed along the rectangular frame surrounding the stability display image.

2. The image display apparatus according to claim 1, wherein
    the subsequent action information includes at least any of pieces of information about acceleration, deceleration, lane-changing, stop of the autonomous driving control, and end of the autonomous driving control.

3. The image display apparatus according to claim 1, wherein
    the stability information acquisition portion determines which range the stability information thus acquired falls under, a normal range, an unstable range, or a cautious range, the normal range being a stability range in which the autonomous driving control is continuable normally, the unstable range being a stability range in which the continuation of the autonomous driving control is unstable, the cautious range being a stability range in which the autonomous driving control is continued between the normal range and the unstable range.

4. An image display apparatus for displaying an image related to an autonomous driving control of an autonomous driving system of a vehicle on a display surface of an in-vehicle display of the vehicle based on information acquired from the autonomous driving system, the image display apparatus comprising:
    a stability information acquisition portion configured to acquire stability information about a stability of the autonomous driving control from the autonomous driving system;
    a subsequent action information acquisition portion configured to acquire, from the autonomous driving system, subsequent action information about a subsequent action of the vehicle by the autonomous driving control; and
    a display control portion configured to control displaying of the in-vehicle display,
        the display control portion being configured such that, when the vehicle is in the autonomous driving control, the display control portion displays:
            a traveling road overlook image showing the vehicle and a traveling road where the vehicle runs in a bird's-eye view;
            a stability display image positioned in a traveling direction of the vehicle in the traveling road overlook image, the stability display image being configured to change according to the stability information inside a rectangular frame extending in a direction intersecting with the travelling direction; and
            a subsequent action text image positioned in the traveling direction relative to the stability display image and indicative of the subsequent action information,
    the image display apparatus further comprising an action reason information acquisition portion configured to acquire, from the autonomous driving system, action reason information about a reason of the subsequent action of the vehicle by the autonomous driving control, wherein
    when the action reason information acquisition portion acquires the action reason information during the autonomous driving control of the vehicle, the display control portion is configured to display an action reason text image indicative of the action reason information on a left side or a right side relative to the stability display image on the display surface.

5. The image display apparatus according to claim 4, wherein the stability information acquisition portion is configured to acquire decrease reason information about a reason of a decrease in the stability from the autonomous driving system; and when the stability information acquisition portion acquires the decrease reason information during the autonomous driving control of the vehicle, the display control portion is configured to display a decrease reason text image indicative of the decrease reason information at a position in the traveling direction relative to the stability display image.

6. The image display apparatus according to claim 5, wherein when the stability decreases to be lower than an initial value, the stability information acquisition portion acquires the decrease reason information about the reason of the decrease in the stability from the autonomous driving system.

7. The image display apparatus according to claim 5, wherein when the stability becomes less than a predetermined threshold, the stability information acquisition portion acquires the decrease reason information about the reason of the decrease in the stability from the autonomous driving system.

8. An image display apparatus for displaying an image related to an autonomous driving control of an autonomous driving system of a vehicle on a display surface of an in-vehicle display of the vehicle based on information acquired from the autonomous driving system, the image display apparatus comprising:

a stability information acquisition portion configured to acquire stability information about a stability of the autonomous driving control from the autonomous driving system;

a subsequent action information acquisition portion configured to acquire, from the autonomous driving system, subsequent action information about a subsequent action of the vehicle by the autonomous driving control; and a display control portion configured to control displaying of the in-vehicle display, the display control portion being configured such that, when the vehicle is in the autonomous driving control, the display control portion displays:

a traveling road overlook image showing the vehicle and a traveling road where the vehicle runs in a bird's-eye view;

a stability display image positioned in a traveling direction of the vehicle in the traveling road overlook image, the stability display image being configured to change according to the stability information inside a rectangular frame extending in a direction intersecting with the travelling direction; and a subsequent action text image positioned in the traveling direction relative to the stability display image and indicative of the subsequent action information, wherein the stability information acquisition portion is configured to acquire decrease reason information about a reason of a decrease in the stability from the autonomous driving system; and when the stability information acquisition portion acquires the decrease reason information during the autonomous driving control of the vehicle, the display control portion is configured to display a decrease reason text image indicative of the decrease reason information at a position in the traveling direction relative to the stability display image.

* * * * *